(12) United States Patent
Tanaka et al.

(10) Patent No.: US 8,010,834 B2
(45) Date of Patent: Aug. 30, 2011

(54) FAILURE INFORMATION MONITORING APPARATUS AND FAILURE INFORMATION MONITORING METHOD

(75) Inventors: Toshiaki Tanaka, Kawasaki (JP); Palina Inthavong, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 198 days.

(21) Appl. No.: 12/569,956

(22) Filed: Sep. 30, 2009

(65) Prior Publication Data
US 2010/0088541 A1    Apr. 8, 2010

(30) Foreign Application Priority Data

Oct. 3, 2008   (JP) ................................. 2008-258746

(51) Int. Cl.
G06F 11/00    (2006.01)
(52) U.S. Cl. ...................................... 714/6.13; 711/173
(58) Field of Classification Search ................. 714/6.13, 714/42; 711/165, 170, 173; 360/48
See application file for complete search history.

(56) References Cited

U.S. PATENT DOCUMENTS

| | | | |
|---|---|---|---|
| 5,818,654 A * | 10/1998 | Reddy et al. ..................... 360/53 |
| 6,259,698 B1 | 7/2001 | Shin et al. | |
| 6,272,612 B1 * | 8/2001 | Bordaz et al. ................. 711/203 |
| 6,598,179 B1 * | 7/2003 | Chirashnya et al. ............. 714/37 |
| 7,392,236 B2 * | 6/2008 | Rusch et al. ........................... 1/1 |
| 7,424,666 B2 * | 9/2008 | Chandwani et al. ........... 714/799 |
| 7,653,839 B2 * | 1/2010 | Takahashi ..................... 714/47.2 |
| 7,739,551 B2 * | 6/2010 | Eickmeyer et al. ........... 714/38.1 |
| 7,917,814 B2 * | 3/2011 | Hu et al. .......................... 714/57 |
| 2001/0011358 A1 * | 8/2001 | Ochiai ............................. 714/45 |
| 2001/0018731 A1 | 8/2001 | Fujii et al. | |
| 2005/0289389 A1 * | 12/2005 | Yamagami et al. ................ 714/8 |
| 2007/0033489 A1 * | 2/2007 | Ruckerbauer et al. ........ 714/763 |

FOREIGN PATENT DOCUMENTS

| | | |
|---|---|---|
| JP | 11-017708 A | 1/1999 |
| JP | 2001-236249 A | 8/2001 |
| JP | 2007-034556 A | 2/2007 |

* cited by examiner

*Primary Examiner* — Marc Duncan
(74) *Attorney, Agent, or Firm* — Fujitsu Patent Center (57) ABSTRACT

According to an aspect of the embodiment, an area control unit refers to usage information of an area management table based on a determined type of an extracted failure information, determines whether the extracted failure information can be stored in a identified lower storage areas, determines a storage location for the extracted failure information in the identified lower storage areas when the extracted failure information can be stored in the identified lower storage areas, and determines a storage location for the extracted failure information in the upper storage areas other than an upper storage area including the identified lower storage areas based on the area management table when the extracted failure information cannot be stored in the identified lower storage areas.

5 Claims, 9 Drawing Sheets

| FAILURE LEVEL | SC COMPONENT | MAC COMPONENT | CPU COMPONENT | MBC COMPONENT |
|---|---|---|---|---|
| MAJOR LEVEL 5 | O | O | O | O |
| MAJOR LEVEL 4 | O | O | O | O |
| MAJOR LEVEL 3 | O | O | O | O |
| MAJOR LEVEL 2 | O | O | O | O |
| MAJOR LEVEL 1 | O | O | O | O |
| MINOR LEVEL 3 | X | X | X | X |
| MINOR LEVEL 2 | X | X | X | X |
| MINOR LEVEL 1 | X | X | X | X |

FIG. 4

TYPE OF FAILURE INFORMATION ↔ SIZE OF FAILURE INFORMATION (kbyte) ↔

| UPPER STORAGE AREA | LOWER STORAGE AREA | | | | | NUMBER OF STORAGE AREAS | | | | | STORAGE LOCATION INFORMATION | | | | |
|---|---|---|---|---|---|---|---|---|---|---|---|---|---|---|---|
| Major | 8 | 4 | 2 | 1 | 0.5 | N1 | N2 | N3 | N4 | N5 | A1 | A2 | A3 | A4 | A5 |
| Minor | 8 | 4 | 2 | 1 | 0.5 | N6 | N7 | N8 | N9 | N10 | A6 | A7 | A8 | A9 | A10 |
| Allscan | 8 | 4 | 2 | 1 | 0.5 | N11 | N12 | N13 | N14 | N15 | A11 | A12 | A13 | A14 | A15 |
| History | 340 | | | | | N16 | | | | | A16 | | | | |
| Config | 44 | 0.7 | | | | N17 | N18 | | | | A17 | A18 | | | |
| Analyze | 912 | | | | | N19 | | | | | A19 | | | | |

FAILURE INFORMATION MONITORING APPARATUS AND FAILURE INFORMATION MONITORING METHOD

CROSS-REFERENCE TO RELATED APPLICATIONS

This application is based upon and claims the benefit of priority of the prior Japanese Patent Application No. 2008-258746, filed on Oct. 3, 2008, the entire contents of which are incorporated herein by reference.

FIELD

The embodiments discussed herein are related to a failure information monitoring apparatus and a failure information monitoring method.

BACKGROUND

Failure information is stored in a memory, and is read and then analyzed to analyze a failure of a computer or a server. There are various types of failure information can be generated. Therefore, it is desirable that a method for storing the failure information in the memory is simplified as much as possible to deal with any type of failure information.

To simplify the method for storing the failure information in a memory, a storage area for storing the failure information in the memory is divided into a plurality of areas of the same size. In this case, the failure information overflows a certain storage area, new failure information is stored in another storage area. Therefore, there is a possibility that the failure information, which has higher important level and is stored in the above another storage area, is lost by overwriting with the new failure information having lower important level.

Then, when the highly important failure information is overwritten, it becomes hard to analyze a highly important failure, such as identifying a failed component. As a result, it is caused that quick maintenance of a component related to such failure that leads to a significant reduction in the computer performance or a system shutdown.

In an input buffer control apparatus and a logical buffer size determination method of the ATM switch system, an input buffer control apparatus for improving the cell loss in the ATM switch is known, and an algorithm for determining the logical buffer size is known.

A memory management apparatus and a memory management method are known which can obtain and release a memory area at high speed regardless of the size of a requested memory area.

A dynamic memory management method, an apparatus, and an electronic device using the method and the apparatus are known which can effectively prevent the fragmentation of memory.

Patent Document 1: Japanese Laid-Open Patent Publication No. 11-17708
Patent Document 2: Japanese Laid-Open Patent Publication No. 2001-236249
Patent Document 3: Japanese Laid-Open Patent Publication No. 2007-34556

SUMMARY

According to an aspect of the embodiment, a failure information monitoring apparatus includes a memory, an area management table, a data extracting unit, a failure classification unit, an area control unit, and a data storage unit. The memory includes a plurality of upper storage areas, and each of the plurality of upper storage areas is associated with a predetermined type of failure information and includes a plurality of lower storage areas at a predetermined location with a predetermined size. The area management table stores, for each lower storage area, size and usage information indicating a usage status of the lower storage area. The data extracting unit extracts failure information from an information processing apparatus. The failure classification unit determines a type of the extracted failure information. The area control unit identifies a plurality of lower storage areas for the extracted failure information based on the determined type of the extracted failure information and the area management table. The data storage unit stores the extracted failure information in the identified plurality of lower storage areas in the memory. The area control unit refers to usage information of the area management table based on the determined type of the extracted failure information, determines whether the extracted failure information is able to be stored in the identified plurality of lower storage areas, determines a storage location for the extracted failure information in the identified plurality of lower storage areas when the extracted failure information is able to be stored in the identified plurality of lower storage areas, and determines a storage location for the extracted failure information in the plurality of upper storage areas other than an upper storage area including the identified plurality of lower storage areas based on the area management table when the extracted failure information is not able to be stored in the identified plurality of lower storage areas. The data storage unit stores the extracted failure information in the determined storage location.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

According to the conventional techniques, in the failure information monitoring apparatus that monitors an information processing apparatus, a storage area for storing the failure information is divided into a plurality of sections of the same size with a simple method. The failure information is stored in the storage area according to a type of failure information.

However, according to our study, in the case that the storage area is just divided with the simple method, when there is no more free space in a storage area for one type of failure information, a storage area for another type of important failure information is overwritten. In addition, when there is no more free space in a storage area corresponding to one type of failure information, it is supposed to prevent the writing of failure information of the type with no more free space. However, even when preventing the writing, there is a possibility that failure information for identifying an important cause of failure is not recorded. In that case, it is difficult for the maintenance person to identify a failed component in the maintenance of the information processing apparatus. As a result, the information processing apparatus cannot be maintained, or a large amount of labor is required for the maintenance.

A failure information monitoring apparatus is provided that can surely store failure information which is predetermined for each of a plurality of storage areas in a memory.

The failure information monitoring apparatus and the failure information monitoring method of an aspect of the disclosed embodiment include an area management table which stores a size and usage information for each lower storage area. Therefore, it is possible to determine whether the failure information can be stored in a lower storage area, based on the area management table. When the failure information cannot be stored in the lower storage areas, in other words, the "corresponding storage areas", the storage location for the failure information can be determined in the upper storage areas other than an upper storage areas to which the corresponding storage areas belong, in other words, which includes the lower storage areas, based on the area management table. In this way, when there is no more free space in one storage area, a storage location for the failure information can be determined in other upper storage areas. As a result, new failure information can be stored, and it is possible to prevent overwriting other failure information by the new failure information.

Preferred embodiments of the present invention will be explained with reference to accompanying drawings.

Figure 1:
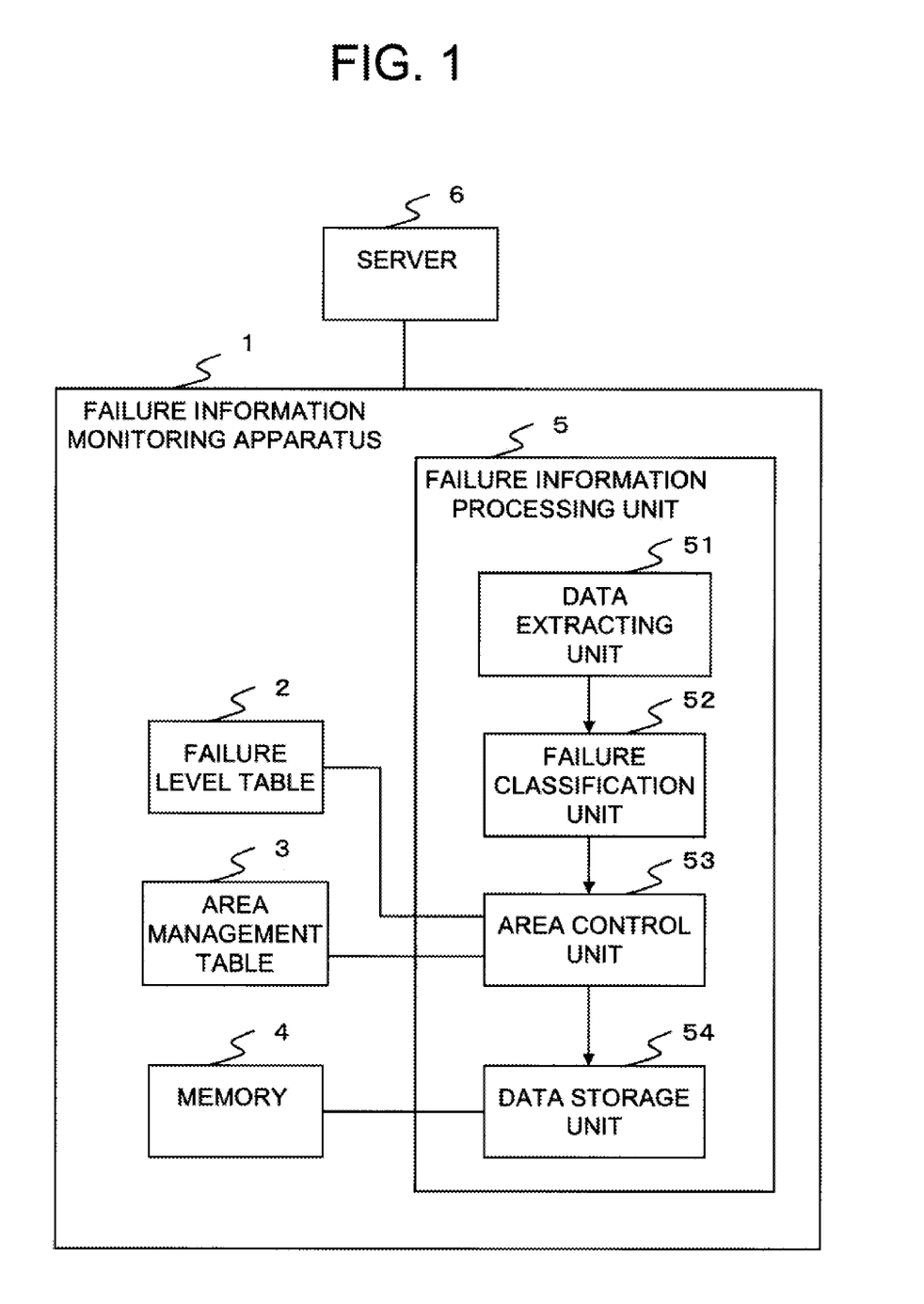
FIG. 1 is a block diagram of a failure information monitoring apparatus according to an embodiment.

FIG. 1 illustrates a structure of a server system including a failure information monitoring apparatus as an embodiment.

The server system includes a failure information monitoring apparatus 1 and a server 6, which are connected through a network such as a LAN. The server 6 may be an information processing apparatus such as a computer. In the example of FIG. 1, the failure information monitoring apparatus 1 is a computer independent from the server 6. The failure information monitoring apparatus 1 monitors the server 6, and stores failure information or log information of the server 6 (hereinafter, both of the failure information and the log information are referred to "failure information"). The failure information monitoring apparatus 1 includes a failure level table 2, an area management table 3, a memory 4, and a failure information processing unit 5. The failure information processing unit 5 stores the failure information of the server 6 in the memory 4 based on information recorded in the failure level table 2 and the area management table 3. In the example of FIG. 1, the failure level table 2, the area management table 3, and the memory 4 are provided outside the failure information processing unit 5. However, the failure information processing unit 5 may include the failure level table 2, the area management table 3, and the memory 4.

The memory 4 includes a plurality of upper storage areas, as described below with reference to FIG. 5. More specifically, the memory 4 is logically divided into a plurality of upper storage areas. The upper storage areas are assigned to the memory 4 so as to correspond to the types of failure information. Each upper storage area includes a plurality of lower storage areas. The lower storage areas are areas which stores the failure information corresponding to the upper storage areas. Each lower storage area is provided at a predetermined location of the memory 4, and has a predetermined sizes.

The failure level table 2 stores failure levels indicating an importance (level) of failure, and information indicating a possibility of a change in the assignment of the storage areas of the memory, which stores the failure information, for each component which is an object of failure monitoring in the server 6 (hereinafter, referred to "target component"). The failure level table 2 is described below with reference to FIG. 3. The target components are described below with reference to FIG. 2.

The area management table 3 stores, for each upper storage area, in other words, for each piece of failure information, information of a plurality of lower storage areas which belong to the upper storage area. The area management table 3 further stores, for each lower storage area in the upper storage areas, a size of the lower storage area and usage information which indicates a usage status of the lower storage area. The area management table 3 is described below with reference to FIG. 4.

The failure information processing unit 5 includes a data extracting unit 51, a failure classification unit 52, an area control unit 53, and a data storage unit 54.

The data extracting unit 51 collects failure information from the server 6, when a failure occurs in the server 6. The data extracting unit 51 receives the failure information transmitted from a failure detecting unit 69 of the server 6, as described below with reference to FIG. 2. The data extracting unit 51 sends the received failure information to the failure classification unit 52.

The failure classification unit 52 determines a type and a size of failure information extracted by the data extracting unit 51. The failure classification unit 52 also determines a failure level of the failure information, as described below. The failure classification unit 52 notifies the determined type, size, and failure level of the failure information to the area control unit 53.

The area control unit 53 refers to the failure level table 2 using the failure level of the failure information determined by the failure classification unit 52. The area control unit 53 determines whether or not to store the failure information in the memory 4 based on a result of reference to the failure level table 2.

When the failure information is to be stored in the memory 4, the control unit 53 refers to the area management table 3 using the type and size of the failure information determined by the failure classification unit 52. The area control unit 53 determines a storage location of the memory 4 to which the failure information extracted by the data extracting unit 51 is to be stored based on a result of reference to the area management table 3. The area control unit 53 notifies the determined storage location to the data storage unit 54.

The data storage unit 54 stores the failure information extracted by the data extracting unit 51 in the storage location determined by the area control unit 53. For this purpose, the failure information extracted by the data extracting unit 51 is sent from the data extracting unit 51 to the data storage unit 54.

Figure 2:
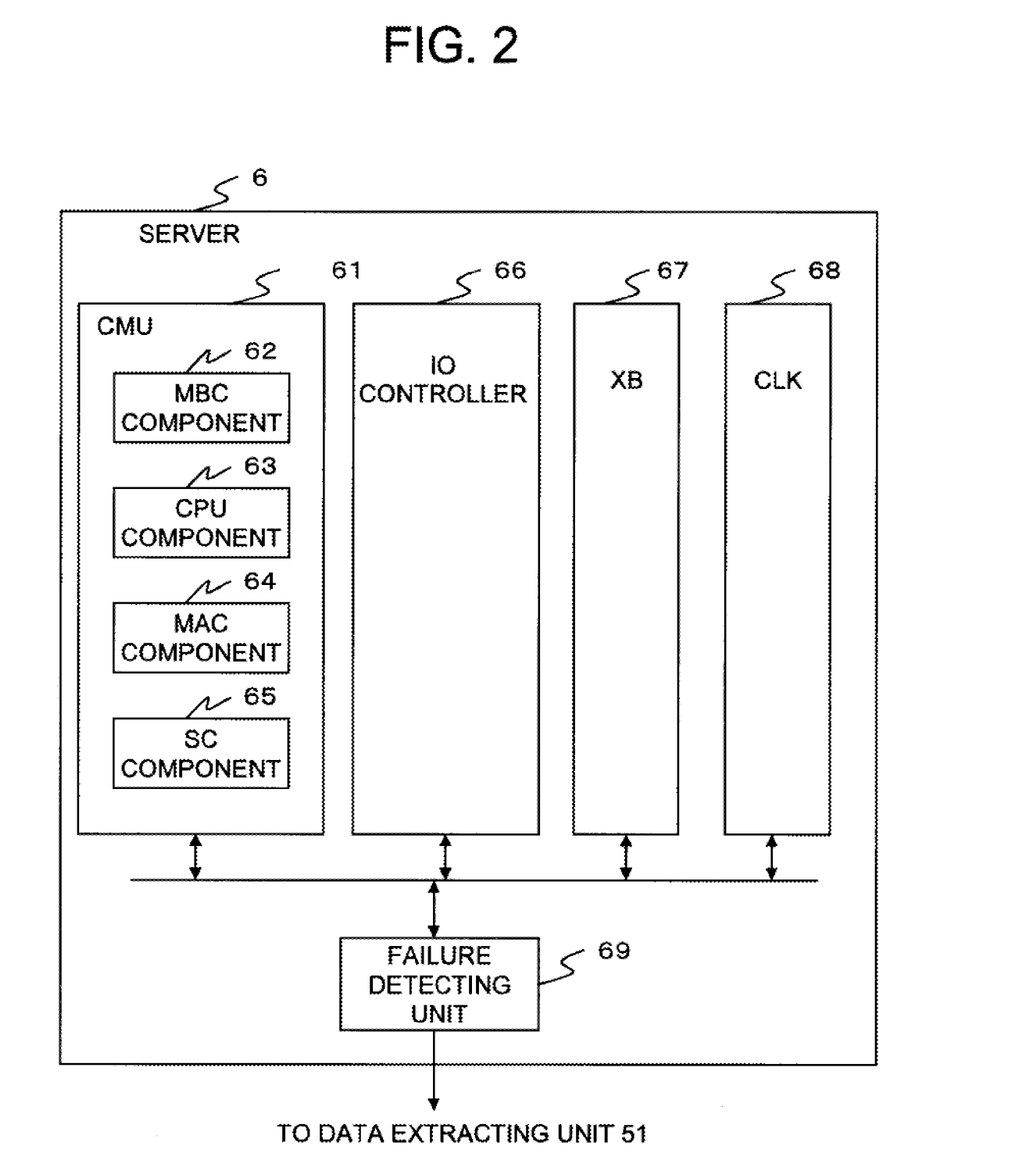
FIG. 2 illustrates a structure of the failure information monitoring apparatus of the present embodiment.

FIG. 2 illustrates an example of a structure of the server 6 in the server system of FIG. 1.

The server 6 of FIG. 2 includes a CMU 61, an IO (input and output) controller 66, a transmitting and receiving apparatus (crossbar or XB) 67, a clock control unit (CLK) 68, and a failure detecting unit 69, as its components.

The CMU 61 is provided with an MBC (Maintenance-Bus Controller) component 62, a CPU (Central Processing Unit) component 63, an MAC (Memory Access Controller) component 64, and an SC (System Controller) component 65. The components 62 to 65 are target components of the failure monitoring.

The IO controller 66 and other components, which are similar with the CMU 61, include a plurality of target components of the failure monitoring. Therefore, the failure information of the IO controller 66 and other components is monitored and processed in the same way as the failure information of the CMU 61. However, the description of the failure information of the IO controller 66 and other components is omitted to simplify the description.

When there is a failure in any of the target components in the CMU 61, the IO controller 66, the XB 67, and the CLK 68, the failure detecting unit 69 detects the failure. When detecting the failure of the target components, the failure detecting unit 69 generates failure information related to the failure, and notifies the failure information to the data extracting unit 51. The failure information includes information indicating a content of the failure, a type and a size of the failure information, and the failure level. Thus, the server 6 provides necessary data to the data extracting unit 51.

Figure 3:
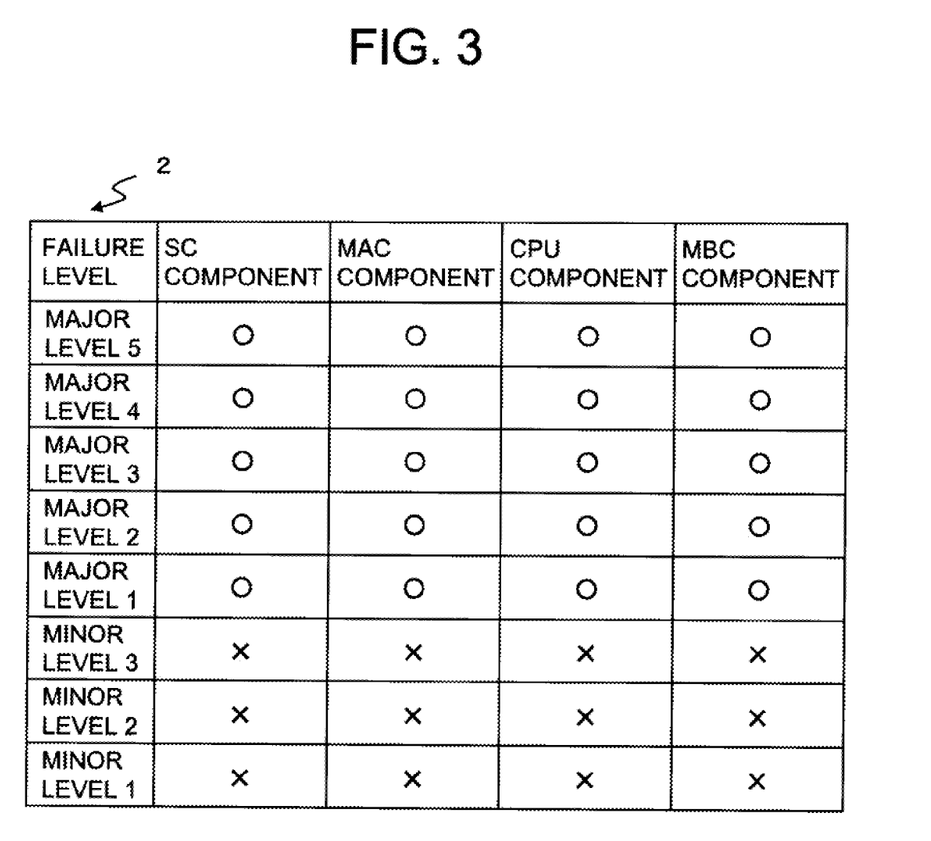
FIG. 3 illustrates a structure of a failure level table.

FIG. 3 illustrates an example of a structure of the failure level table 2.

The failure level table 2 is prepared in advance, and stores, for each target component, a correspondence between the failure level and information of the changing possibility in the assignment of corresponding storage areas (in other words, lower storage areas) for the failure information. Hereinafter, the information indicating the changing possibility in the assignment of the corresponding storage areas is referred to as "change information." The failure level is information indicating the importance level of failure, and includes serious levels 5 to 1 and mild levels 3 to 1 in the example of FIG. 3. This order indicates an order of the importance level of failure. The change information indicates, for each failure level of the target components, whether or not to permit the change in the assignment of the storage areas corresponding to the failure information generated in the target components. In other words, the change information is mode information indicating whether the assignment of the corresponding storage areas for the failure information is in a changing mode.

The failure level table 2 stores correspondence between the failure level and the change information on the MBC component 62, the CPU component 63, the MAC component 64, and the SC component 65, for example, which are target components. In the change information, marks of "circle" indicate that the assignment of the storage areas can be changed, and marks of "X" indicate that the assignment of the storage areas cannot be changed.

Based on the information stored in the failure level table 2, the area control unit 53 changes (increases an amount of) the assignment of the corresponding storage areas for the failure information having serious levels, but does not change the assignment of the corresponding storage areas for the failure information having mild levels. As a result, serious failure information stored in the memory is not overwritten by the failure information, and is stored as it is. On the other hand, there is a possibility that not-serious failure information stored in the memory is overwritten by newly generated failure information.

One or a plurality of intermediate failure levels may be arranged between the serious levels and the mild levels, and change information may be set for each intermediate failure level.

Figure 4:
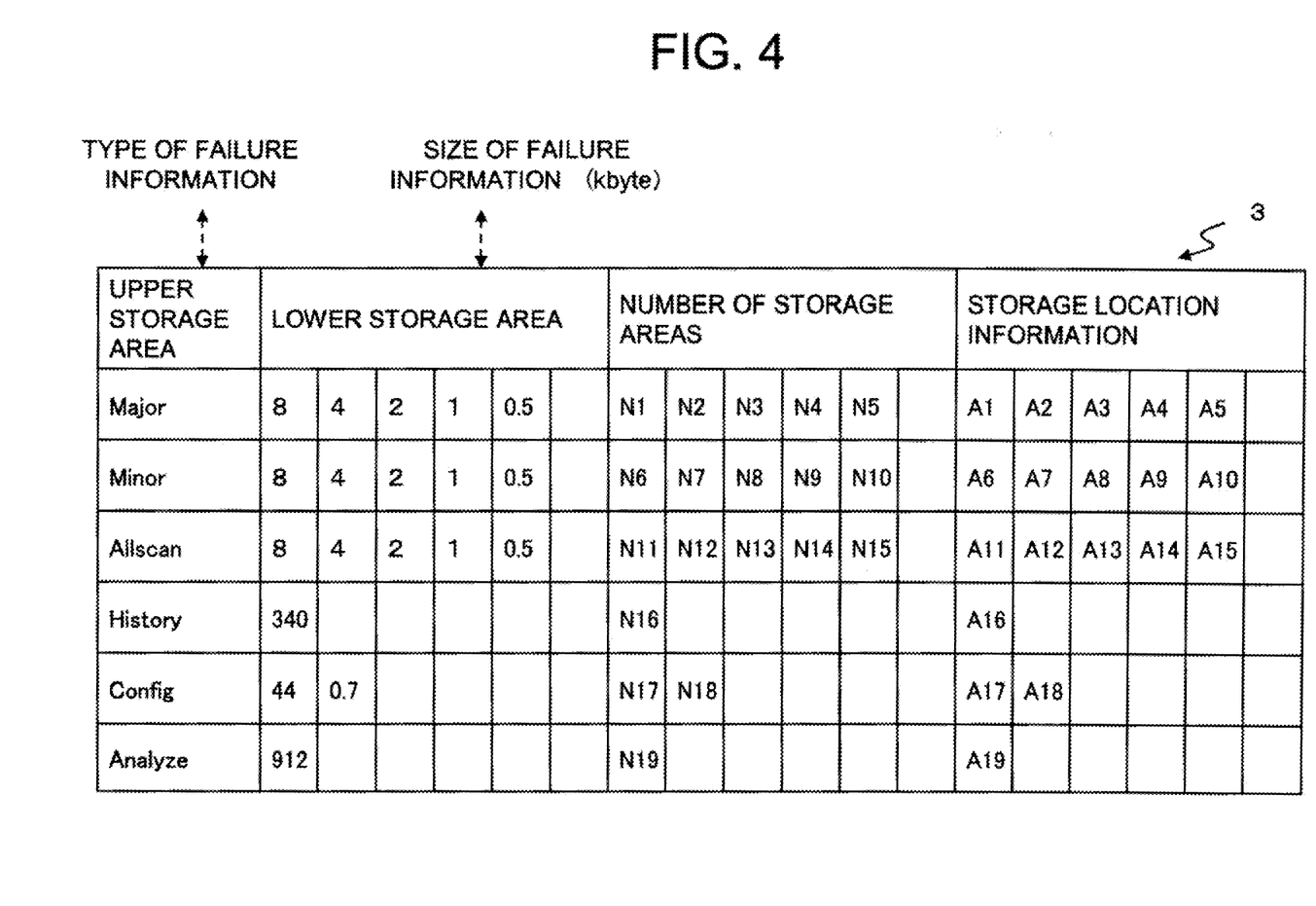
FIG. 4 illustrates an embodiment of an area management table.

FIG. 4 illustrates an embodiment of the area management table.

The area management table 3 stores, for each type of failure information, information of a size (in kilobytes) of each piece of the failure information, information of a number of remaining generations of storage area, and information of the storage location (address). Both of the information of the number of remaining generations of storage area and the storage location information are collectively referred to as "usage information." The storage location information is information indicating the location (address) to which the failure information is stored in the memory. In response to determination of the lower storage area storing the failure information, the location in the memory is also determined to which the type of failure information and the failure information are stored.

In the example of FIG. 4, the types of failure information include, for example, "Major", "Minor", "Allscan", "History", "Config", and "Analyze". The failure information is associated with the upper storage areas in the area management table 3. For example, failure information "Major", in other words, the type "Major" of failure information, corresponds to an upper storage area "Major". The same applies to other types.

The failure information "Major" is serious failure information or major failure information. Failure information "Minor" is mild failure information or minor failure information. When a failure occurred, the failure information "Major" changes according to the failure, and the failure information includes information for identifying a part where the failure occurred in the server 1. The failure is analyzed by referring to the failure information "Major". The same applies to the failure information "Minor".

The failure information "Allscan" is information of the entire hardware included in the server 1. The failure information "History" is operation history information of each hardware included in the server 1. The failure information "Config" is information set in the each hardware included in the server 1. To analyze the failure based on the failure information "Major" or the failure information "Minor", there is a possibility that information for the failure analysis is insufficient just with the failure information "Major" or the failure information "Minor". Therefore, the failure information "Allscan", the failure information "History", and the failure information "Config" are referenced. In other words, these three pieces of failure information are auxiliary information of the failure information "Major" or the failure information "Minor". The same applies to the failure information "History" and the failure information "Config". The failure information "Analyze" is auxiliary information for analyzing failure factors, and is information other than the above three pieces of failure information.

The failure information size of each piece of failure information is set in a field of the lower storage area. When a certain failure information can have a plurality of failure information sizes, the plurality of failure information sizes are set in the field of the lower storage area. For example, assuming that there are five types of 8, 4, 2, 1, and 0.5 (kilobytes) for failure information sizes in the upper storage area "Major". Accordingly, "8," "4," "2," "1," and "0.5" are set in the lower storage area corresponding to the failure information "Major", in an area management table 3 of FIG. 4. The same applies to other failure information. A field of "number of storage areas" corresponding to each "lower storage area" is also set in the area management table 3. For example, the number of remaining generations of the storage area corresponding to the failure information having 8-kilobyte size in the failure information "Major" is N1. The numbers are also predetermined for other failure information, as illustrated in FIG. 3.

For example, in the "Major" area which is an upper storage area, the lower storage area corresponding to the failure information having 2-kilobyte size is expressed as "Major2k". The "lower storage area Major2k" is simply expressed as "Major2k". The same applies to other areas.

In the field of the number of storage areas, N1 to N5 are number of remaining generations that can store the failure information in the storage areas corresponding to the failure information sizes "8," "4," "2," "1," and "0.5" of the failure information "Major". N1 to N5 are integers 0 or greater. The same applies to N6 to N19. The number of remaining generations are number of lower storage areas which can store the failure information, and correspond to the failure information.

For example, when the failure information of "Major2k" is not stored, the number of remaining generations of lower storage area is N3. Then, when one generation of failure information is stored in the storage area, the number of remaining generations is (N3−1). Further, when all generations of failure information are stored in the lower storage area corresponding to "Major2k", the number of remaining generations of lower storage area corresponding to "Major2k" is (N3−N3)=0. In other words, the free storage area corresponding to "Major2k" is 0.

In the field of the number of storage location information, A1 to A5 are storage location information of the storage areas corresponding to the failure information sizes "8," "4," "2," "1," and "0.5" in the failure information "Major". The same applies to A6 to A19. In other words, for example, A3 is an address which stores the failure information having the failure information size of "8.", in the failure information "Major."

Specifically, when the failure information of "Major2k" is not stored, the number of remaining generations of the lower storage area is N3 as described above, so that A3 is free. When one generation of failure information is stored in the storage area, A3 includes one address. When all N3 generations of failure information are stored in the lower storage area corresponding to "Major2k", A3 includes N3 addresses.

Figure 5:
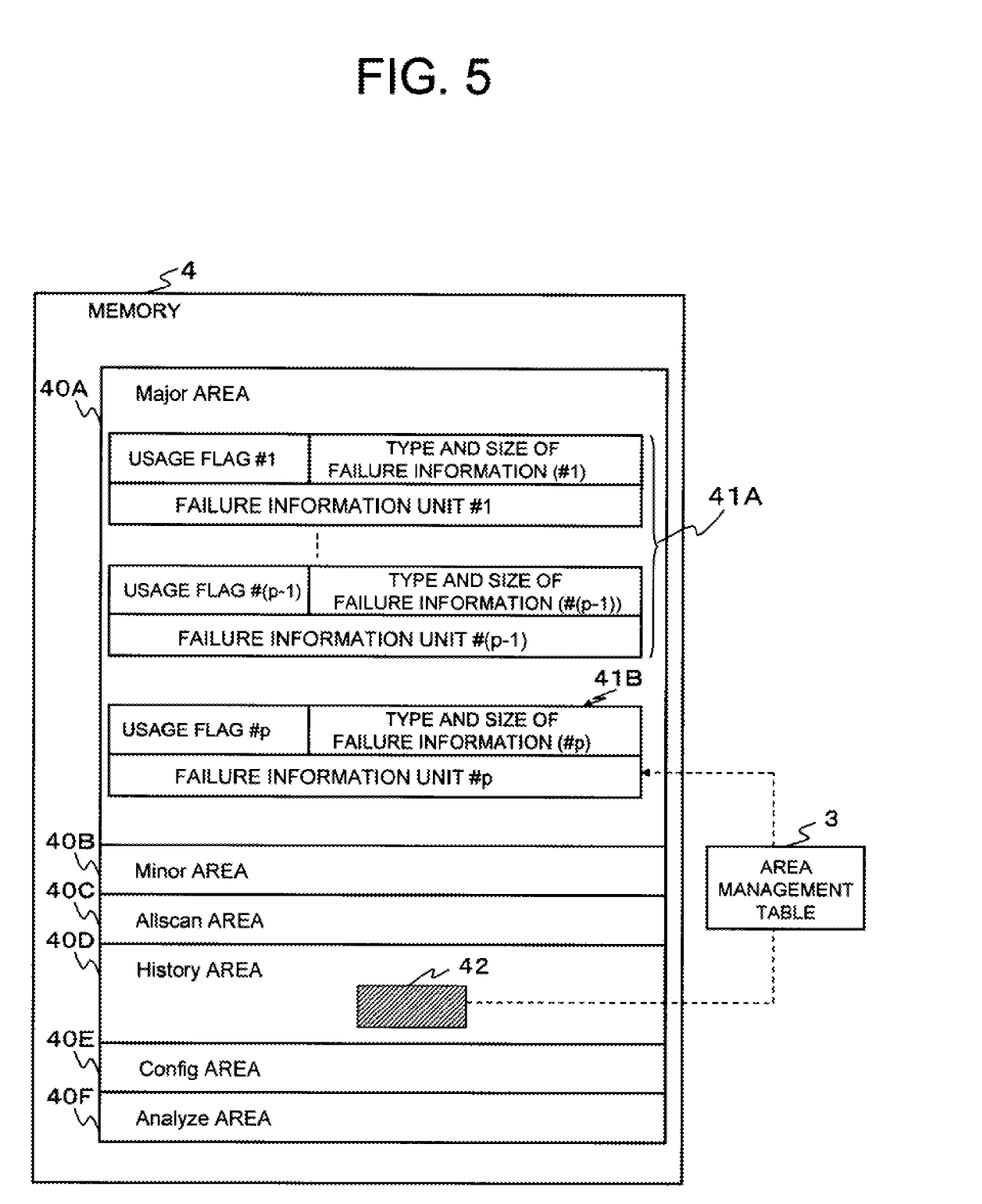
FIG. 5 illustrates an example of an assignment change of a storage area.

FIG. 5 illustrates an example of assignment of storage areas on the memory and a change in the assignment.

At the initial setting of assignment, predetermined fixed sizes of areas in the memory 4 are assigned to each of the upper storage areas 40 for the failure information. In the example of FIG. 5, the upper storage areas 40 include a "Major" area 40A, a "Minor" area 40B, an "Allscan" area 40C, a "History" area 40D, a "Config" area 40E, and an "Analyze" area 40F. The "Major" area 40A includes a plurality of lower storage areas 41A and a lower storage area 41B. The lower storage areas 41A are areas originally assigned to the "Major" area 40A. The lower storage area 41B is an area newly assigned to the "Major" area 40A from another upper storage area, for example, from the "History" area 40D in the example of FIG. 5, as described below with reference to FIG. 5.

The lower storage area 41A is a failure information storage section including a usage flag, a type and a size of failure information, and a failure information section. The usage flag is a flag indicating whether the storage area is used or free. The type and the size of failure information is information indicating the type of failure information and the storage size of the failure information. The failure information section is an area that stores the failure information. The lower storage area 41B also has the same structure as the lower storage area 41A.

For example, in the example of FIG. 5, the number of lower storage areas 41A of the "Major" area 40A is (p−1). Therefore, an initial value of the number of remaining generations of the lower storage areas 41A of the "Major" area 40A is (p−1). First failure information #1 is stored at the top of the plurality of lower storage areas 41A. The failure information #1 includes a usage flag #1, has a size #1, and is stored in a failure information section #1. At the end of the plurality of lower storage areas 41A, the (p−1)th failure information #(p−1) is stored. The failure information #(p−1) is formed in the same way as the failure information #1.

In FIG. 5, the failure information stored in the "Major" area 40A reaches (p−1). Therefore, the number of remaining generations of the lower storage areas 41A of the "Major" area 40A is "0." In this case, a new lower storage area 41B of the "Major" area 40A is obtained by the following assignment changing processing, and the p-th failure information #p is stored in the lower storage area 41B. The failure information #p includes a usage flag #p, has a size #p, and is stored in the failure information section #p. The new lower storage area 41B is originally a lower storage area of another upper storage area such as the "History" area 40D.

As described, based on the area management table 3, the area control unit 53 identifies lower storage areas of the memory 4 to which the failure information extracted by the data extracting unit 51 is to be stored. For example, when the type of failure information is "Major" and the size is 8 (kilobytes), "Major8k" is the lower storage area to which the failure information is to be stored. Therefore, the type and the size of failure information are provided in the failure information.

The area control unit 53 further determines whether the failure information can be stored in the identified lower storage areas, in other words, "corresponding storage areas", based on the area management table 3. Specifically, the area control unit 53 refers to the number of storage areas in the area management table 3 in relation to the identified lower storage areas. As described above, the number of storage areas indicates the number of remaining generations of lower storage area at the time. Therefore, the area control unit 53 checks whether or not the number of remaining generations of the identified lower storage areas is "0." The area control unit 53 determines that the failure information can be stored in the corresponding storage areas, when the number of remaining generations is not 0. And, the area control unit 53 determines that the failure information cannot be stored in the corresponding storage areas, when the number of remaining generations is 0. In the example of FIG. 5, the number of remaining generations of the lower storage area 41A (for example, "Major8k") of the "Major" area 40A is "0".

When the failure information can be stored in the "corresponding storage areas", in other words, in the identified plurality of lower storage areas, the area control unit 53 determines a storage location in the corresponding storage areas for actually storing the failure information. At the same time, the area control unit 53 subtracts "1" from the number of storage areas, or the number of remaining generations, in the area management table 3 in relation to the identified lower storage areas. When the data storage unit 54 stores the failure information in the corresponding storage areas, the area control unit 53 reflects usage information of the corresponding storage areas of the type of the stored failure information to the area management table 3.

On the other hand, when determining that the failure information cannot be stored in the corresponding storage areas, the area control unit 53 determines the storage location for the failure information in the upper storage areas other than an upper storage area to which the corresponding storage areas belongs, based on the area management table 3. And then, when the data storage unit 54 stores the failure information in the determined storage area in the upper storage areas other than the upper storage area to which the corresponding storage areas belongs, the area control unit 53 reflects information of the assignment of storage areas and usage information to the area management table 3.

Specifically, when the failure information cannot be stored in the corresponding storage areas, the area control unit 53 refers to the failure level table 2, and reads a failure level corresponding to the target component of the failure information extracted by the data extracting unit 51. And, when the failure level is equal to or higher than a predetermined failure level, the area control unit 53 determines whether the storage location for the failure information needs to be changed. For example, when the type of failure information of the SC component CPU is serious level 1 ("Major"), the failure level is a mark of "circle", so that the area control unit 53 determines that the storage location for the failure information needs to be changed When the storage location needs to be changed, the area control unit 53 determines a storage location for the failure information in the upper storage areas other than the upper storage area to which the corresponding storage areas for the failure information belongs, based on the area management table 3. In other words, the area control unit 53 refers to the information of the changing possibility in the assignment of the corresponding storage areas, which corresponds to the failure level of the failure level table 2, before the change in the assignment of the corresponding storage areas for the failure information.

When the assignment change of lower storage areas is necessary, the area control unit 53 refers to the area management table 3, selects a lower storage area corresponding to the type of another piece of failure information having the maximum free space, for example, and determines the lower storage area for the failure information, of which assignment is changed.

It is assumed in the example of FIG. 5 that a free space of "History340k", which is a lower storage area of the "History" area 40D, for example, is the maximum. In this case, the area control unit 53 selects the lower storage area of the "History" area 40D as the lower storage area of which assignment is changed, and determines the selected lower storage area as a storage location 42 of the failure information #p.

Specifically, the area control unit 53 divides the lower storage area of the "History" area 40D, for example, one generation of areas of "History340k", into x lower storage areas. The x lower storage areas has the same size as the size of the lower storage areas of the "History" area 40D which is the assigned locations, for example, the size of "Major8k". The area control unit 53 adds the number after division to the lower storage area 41A of the "Major" area 40A in the area management table 3, or adds a value x to "the number of storage areas" of "Major8k", for example. And, the area control unit 53 subtracts 1 from the lower storage area of the "History" area 40D, or "the number of storage areas" of "History340k", for example (subtracts one generation from the number of remaining generations). The area control unit 53 also deletes, for example, one generation of storage location of "History340k" from the "storage location information" of "History340k" in the area management table 3. And, the area control unit 53 writes, for example, the storage locations of x lower storage areas to the "storage location information" of "Major8k". The order of the processing is not particularly limited, and any process can be executed first.

The area control unit 53 selects, for example, an area at the top of the x lower storage areas of "Major8k" as the storage location 42, and notifies the selected storage location of the lower storage areas to the data storage unit 54. The data storage unit 54 stores the failure information #p of "Major" in the notified storage location 42. The storage location 42 is originally a lower storage area of the "History" area 40D, and is set as a lower storage area of the "Major" area 40A by the assignment change. The data storage unit 54 sets a usage status to the usage flag #p, sets the type and the size (for example, "Major" and "2k") corresponding to the failure information of "Major" in the "type and size of failure information (#p)," and stores the data of the failure information #p in the failure information section #p.

After the storage of the failure information, the area control unit 53 reflects the usage information of the corresponding storage areas of the type of the stored failure information to the area management table 3. Specifically, the area control unit 53 changes the number of remaining generations of the storage area. For example, the area control unit 53 subtracts 1 from the number of remaining generations of the lower storage area of the "History" area 40D such as "Major8k".

According to an instruction of the area control unit 53, the data storage unit 54 stores the failure information #p of "Major" in the storage location 42 in the "History" area 40D, and changes the assignment of the storage location 42 to the area 41B, which is assigned to the "Major" area 40A. As a result, the failure information #p of "Major" is stored in the lower storage area 41B, which corresponds to the "Major" area 40A. In this way, the failure information monitoring apparatus 1 can store the failure information in another lower storage area, even when there is no more free space for storing the failure information in the lower storage area corresponding to the "Major" area 40A.

Figure 6A:
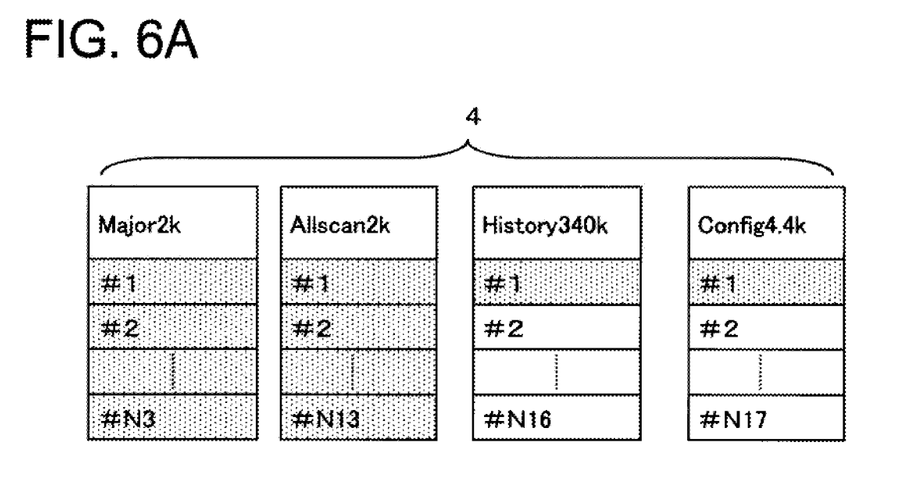
FIG. 6 illustrates first and second processes during storage of failure information.
Figure 6B:
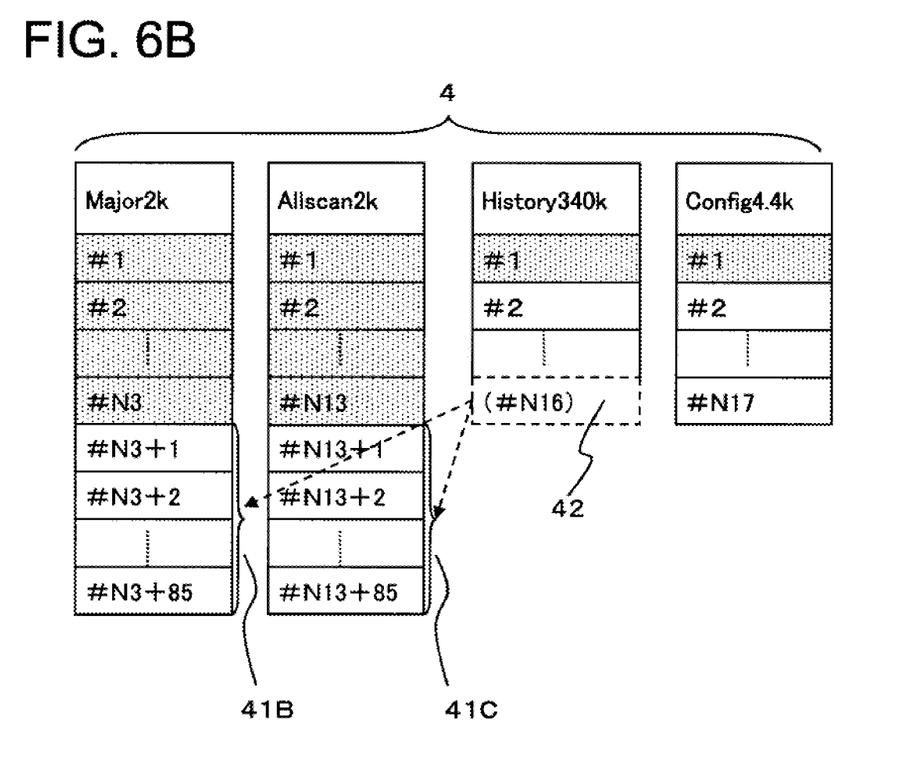
Figure 7:
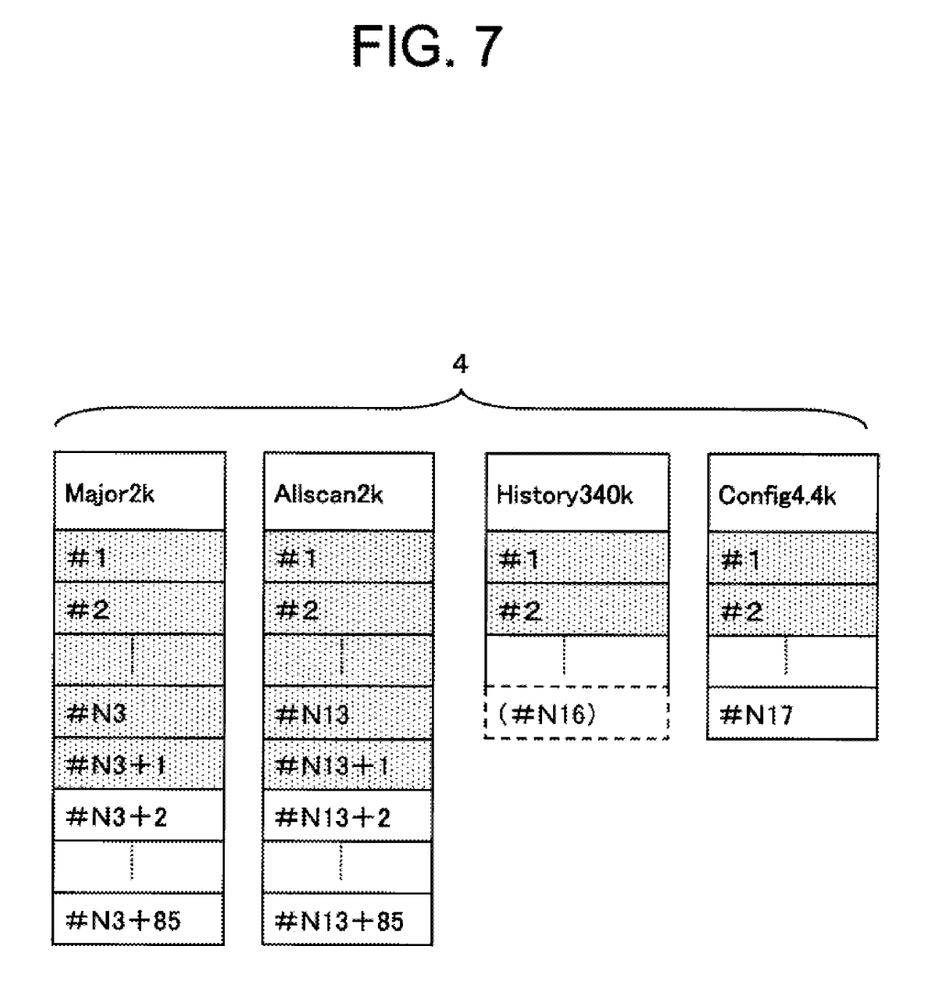
FIG. 7 illustrates a third process during storage of failure information.

FIGS. 6 and 7 illustrate processes during storage of the failure information. With reference to FIGS. 6 and 7, processing is described which is executed by the failure information monitoring apparatus 1 for storing the failure information of, for example, the SC component 65 in the "Major" area, the "Allscan" area, the "History" area, and the "Config" area.

FIG. 6A illustrates a state in which there is no more free space in "Major2k" and "Allscan2k", both of which are lower storage areas.

In FIG. 6A, the lower storage areas "Major2k" and "Allscan2k" are used up to N3 and N13 generations, respectively. The used lower storage areas are shaded (the same applies to other areas). Therefore, the lower storage areas corresponding to the failure information "Major2k" and the failure information "Allscan2k" are not free. In other words, the information of the remaining generations of the storage areas of "Major2k" is (N3−N3)=0, and the information of the remaining generations of the storage areas of "Allscan2k" is (N13−N13)=0, in the area management table 3. The area control unit 53 refers to the area management table 3, and recognizes that there is no free space in the storage areas for the failure information in "Major2k" and "Allscan2k". Further, only one generation is used in the lower storage areas "History340k" and "Config4.4k". In other words, (N16−1) and (N17−1) pieces of information are respectively stored as the information of the remaining generations of the storage areas of "History340k" and "Config4.4k", in the area management table 3.

Under these circumstances, the area control unit 53 refers to the area management table 3 to control the storage of newly generated failure information, as described above. In this way, whether the generated failure information can be stored in the corresponding lower storage area can be determined.

FIG. 6B illustrates that a part of the free spaces of the lower storage area "History340k" is assigned to the lower storage areas for storing the failure information of "Major2k" and "Allscan2k".

In FIG. 6A, the area control unit 53 receives the failure information of "Major2k" and "Allscan2k" as failure information of the SC component 65. As described above, the area control unit 53 controls the storage of the failure information. More specifically, the area control unit 53 refers to the area management table 3, determines that there are remaining areas for storing the failure information in the lower storage areas of "History340k" and "Config4.4k", and determines that there is no remaining area for storing the failure information in the lower storage areas of "Major2k" and "Allscan2k".

Based on the information corresponding to the serious failure level of the SC component 65, which is determined by the failure classification unit 52, the area control unit 53 refers to the failure level table 2, and determines that the assignment change of storage areas corresponding to the generated failure information is possible. In other words, the area control unit 53 determines that the remaining areas of the lower storage areas of "History340k" and "Config4.4k" can be changed to the lower storage areas of "Major2k" and "Allscan2k".

The area control unit 53 controls the assignment change of the storage areas of "Major2k" and "Allscan2k" based on the foregoing processing. In this case, the area control unit 53 selects the lower storage area having the maximum free space size among the lower storage areas corresponding to the upper storage areas other than "Major" and "Allscan". Then, the area control unit 53 changes the assignment so that the failure information can be stored in the selected lower storage area. In FIG. 6B, the area control unit 53 selects the lower storage area "History340k" in the "History" area which is the upper storage areas.

The area control unit 53 divides one generation #N16 of the free space of "History340k" of the lower storage area into 2 kilobyte pieces to generate 170 generations of storage areas. Then, the area control unit 53 assigns storage areas #(N3+1) to #(N3+85) to "Major2k". This is the lower storage area 41B. Thus, the assignment of the lower storage area 41B is changed from "History340k" to "Major2k" (assignment change). The area control unit 53 also assigns storage areas #(N13+1) to #(N13+85) to "Allscan2k". This is a lower storage area 41C. Thus, the assignment of the lower storage area 41C is changed from "History340k" to "Allscan2k". As a result, the number of remaining generations of "Major2k" and "Allscan2k" is 85 generations, respectively. The area control unit 53 further subtracts 1 from (N16−1), so that the number of remaining generations of "History340k" becomes (N16−2). This is illustrated with a dotted line in FIG. 6B.

In FIG. 6A, the free space of the lower storage area "History340k" of the upper storage area "History" area is assigned. However, free areas of the lower storage areas other than the "History" area, such as "Allscan (8k, 4k)" and "Config (4.4k)", may be assigned, when there are enough free areas.

FIG. 7 illustrates, after the area assignment of FIG. 6B by the area control unit 53, a state in which the data storage unit 54 stores one generation of the failure information corresponding to "Major2k", "Allscan2k", "History340k", and "Config4.4k" in the lower storage areas, respectively.

After the assignment change by the area control unit 53, the data storage unit 54 stores the failure information of "Major2k" in the storage location of #(N3+1), and stores the failure information of "Allscan2k" in the storage location of #(N13+1). The data storage unit 54 also stores the failure information of "History340k" in the storage location of the lower storage area #2 of "History 340k", and stores the failure information of "Config4.4k" in the storage location of the lower storage area #2 of "Config4.4k".

The area control unit 53 then reflects the storage result of the failure information to the information of the number of remaining generations of the storage areas corresponding to the area management table 3. More specifically, the area control unit 53 sets the number of remaining generations of "Major2k" of the area management table 3 to 84 (=85−1), sets the number of remaining generations of "Allscan2k" to 84 (=85−1), and stores the storage location information and the usage information in the area management table 3. The area control unit 53 also sets the number of remaining generations of "History340k" to (N16−3), sets the number of remaining generations of "Config4.4k" to (N17−2), and reflects the usage information to the area management table 3.

Figure 8:
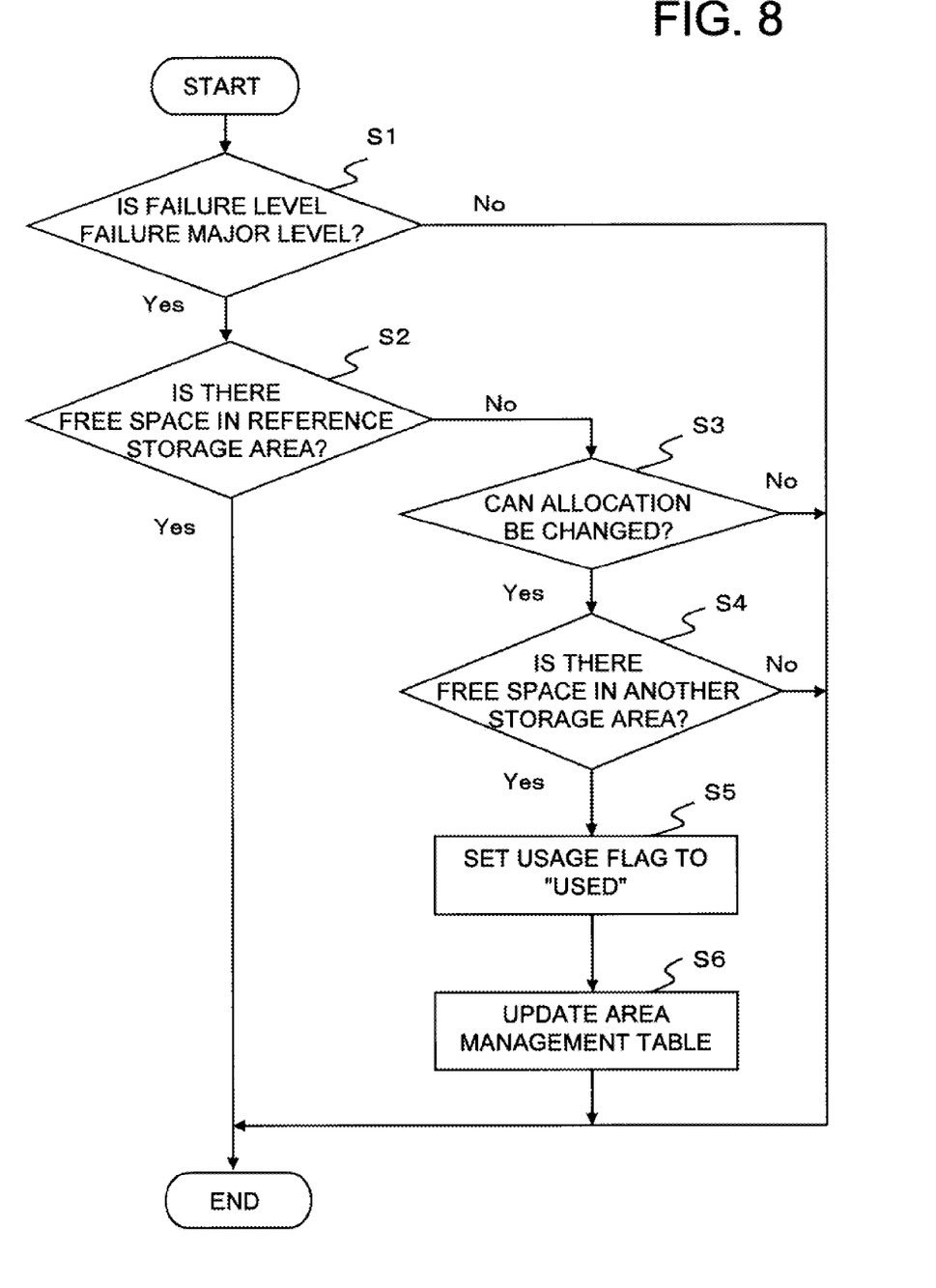
FIG. 8 illustrates a process flowchart of area control during storage of failure information of an area control unit.

FIG. 8 illustrates a process flowchart of area control executed by the area control unit 53 in a storage processing of the failure information.

The area control unit 53 receives the type, the size, and the failure level of the failure information from the failure classification unit 52. And then, the area control unit 53 refers to the failure level table 2, and determines whether the received failure level of the target component is equal to or lower than a predetermined failure level, or whether the failure level is a serious level (step S1).

When the failure level is not a serious level (S1 No), the area control unit 53 ends the processing. The storage area is not changed regardless of whether there is any free space in the storage area. Therefore, there is a possibility that the failure information previously stored in the storage area is overwritten and lost. However, the overwritten failure information is not important, and does not affect the failure analysis.

Meanwhile, when the failure level is a serious level (S1 Yes), the area control unit 53 determines whether there is any free space in the lower storage area that is corresponding storage areas for the failure information (hereinafter referred to as "own storage area") (step S2).

When there is a free space in the own storage area corresponding to the failure information (S2 Yes), the area control unit 53 ends the processing. The failure information can be stored in the memory without overwriting the failure information previously stored in the lower storage area, since there is a free space in the lower storage area corresponding to the failure information.

When there is no free space in the own storage area corresponding to the failure information (S2 No), the area control unit 53 refers to the change information indicating the changing possibility in the assignment of the own storage area recorded in the failure level table 2, and determines whether the assignment change of storage areas is possible (step S3). When the assignment change of storage areas is not possible, in other words, when a changing mode is not set (S3 No), the area control unit 53 ends the processing.

When the change in the assignment of storage areas is possible, in other words, when the changing mode is set (S3 Yes), the area control unit 53 refers to the area management table 3, and determines whether there is any free space in the upper storage areas (hereinafter "other upper storage areas") other than an upper storage area to which the own storage area corresponding to the failure information belongs (step S4). When there is no free space in the other upper storage areas (S4 No), the area control unit 53 ends the processing.

When there is a free space in the other upper storage areas (S4 Yes), the area control unit 53 selects one of the free lower storage areas from one of the upper storage areas, assigns the lower storage area to the own storage area, and sets the usage information of the selected lower storage area to used (step S5).

When there are free spaces in a plurality of upper storage areas, or when there are a plurality of free lower storage areas, a free lower storage area is selected from the upper storage area with the largest size, for example. When there are a plurality of free lower storage areas in the selected upper storage area, the lower storage areas to be assigned are selected in the order of the addresses of the lower storage areas, for example. For example, it is assumed that one generation (340k bytes) of "History340k" is changed to the storage area of "Major2k", and generates 170 generations of "Major2k". In this case, the usage information of one generation of "History340k" is set to used, while the usage information of 170 generations of "Major2k" is set to free.

The area control unit 53 reflects the description of the assignment of lower storage areas, such as the type, the size, and the location (or address) of the failure information of the assigned lower storage area, to the area management table 3. In other words, the area control unit 53 updates the type, the size, and the location of the failure information to reflect the description to the area management table 3 (step S6).

Consequently, the area control unit 53 refers to the area management table 3, and determines that the storage area assigned to the failure information is the own storage area. Therefore, the area control unit 53 determines the storage location of the storage area for the failure information in accordance with the updated area management table 3, and notifies the storage location to the data storage unit 54.

Figure 9:
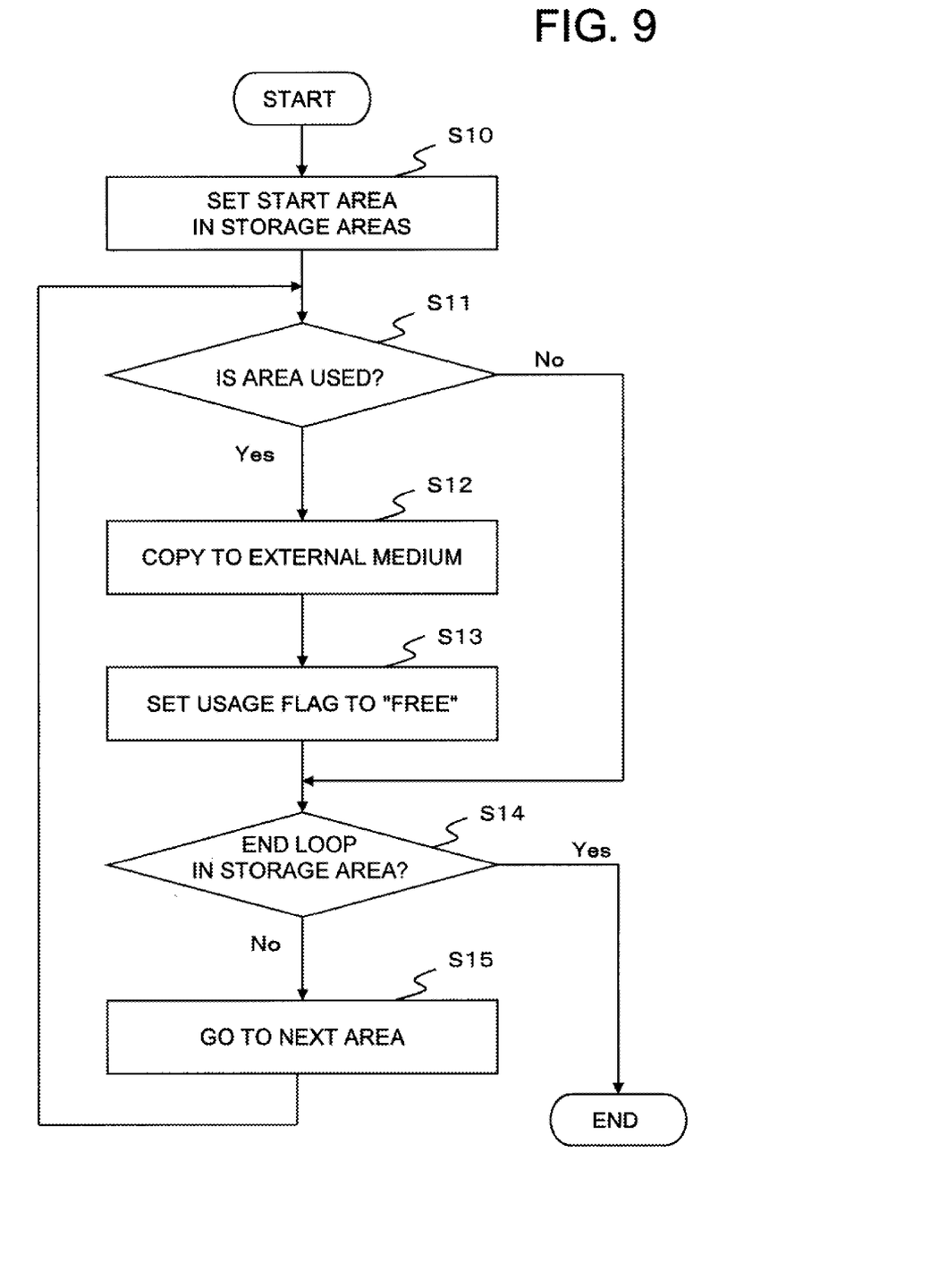
FIG. 9 illustrates a process flowchart of reading of the failure information in the failure information monitoring apparatus.

FIG. 9 is a process flowchart of an example of a reading processing of failure information stored in the memory 4 in the failure information monitoring apparatus 1.

In the failure information monitoring apparatus 1, the area control unit 53, for example, sets storage areas from which the failure information in the memory 4 is to be read, in other words, sets storage areas object to the reading processing, and sets a storage area from which the reading processing is started (step S10). For example, an input and output apparatus inputs, from outside the failure information monitoring apparatus 1, information for the setting. The area control unit 53 refers to the area management table 3 to determine whether the set storage area is used based on the usage information (step S11).

When the set storage area is used (S11 Yes), the area control unit 53 notifies the storage area to the data storage unit 54. In response to the notification, the data storage unit 54 reads the data stored in the notified storage area location, or failure information, and outputs the data to an external medium connected to the failure information monitoring apparatus 1. As a result, the failure information is copied to the external medium (a CD-ROM for example) (step S12). The area control unit 53 sets the usage information of the storage area in the area management table 3 to "FREE," and the data storage unit 54 sets the usage flag of the storage area to "FREE" (step S13).

In the step S11, when the storage area is not used, or "FREE" (S11 No), the processing of the steps S12 and S13 are skipped.

Subsequently, the area control unit 53 determines whether the reading of the failure information is finished up to the end location of the storage area objected to the reading processing (step S14). When the reading is not finished, the area control unit 53 sets a storage area located next to the storage area processed at that point as a target of the reading processing (step S15) and repeats step S11 and the following processing. On the other hand, when the reading is finished, the area control unit 53 ends the processing.

In this way, the failure information in the memory 4 is copied from the failure information monitoring apparatus 1 to the external medium. Subsequently, for example, the area control unit 53 cancels the increase and decrease of the changed assignment of storage areas. Thus, the state of the assignment of storage areas before the assignment change is restored. As a result, for example, the assignment of storage areas changed as illustrated in FIG. 6B is returned to the state before the change illustrated in FIG. 6A.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the sprit and scope of the invention.

What is claimed is:

1. A failure information monitoring apparatus comprising:
    a memory including a plurality of upper storage areas, each of the plurality of upper storage areas being associated with a predetermined type of failure information, and including a plurality of lower storage areas at a predetermined location with a predetermined size;
    an area management table that stores, for each lower storage area, size and usage information indicating a usage status of the lower storage area;
    a data extracting unit that extracts failure information from an information processing apparatus;
    a failure classification unit that determines a type of the extracted failure information;
    an area control unit that identifies a plurality of lower storage areas for the extracted failure information based on the determined type of the extracted failure information and the area management table; and
    a data storage unit that stores the extracted failure information in the identified plurality of lower storage areas in the memory,
    wherein the area control unit refers to usage information of the area management table based on the determined type of the extracted failure information, determines whether the extracted failure information is able to be stored in the identified plurality of lower storage areas, determines a storage location for the extracted failure information in the identified plurality of lower storage areas when the extracted failure information is able to be stored in the identified plurality of lower storage areas, and determines a storage location for the extracted failure information in the plurality of upper storage areas other than an upper storage area including the identified plurality of lower storage areas based on the area management table when the extracted failure information is not able to be stored in the identified plurality of lower storage areas, and wherein the data storage unit stores the extracted failure information in the determined storage location.

2. The failure information monitoring apparatus according to claim 1, wherein the area control unit reflects usage information of the determined storage location for the extracted failure information to the area management table when the extracted failure information is able to be stored in the identified plurality of lower storage areas, and reflects the determined type, an address, a size, and usage information of the determined storage location to the area management table when the extracted failure information is not able to be stored in the identified plurality of lower storage areas.

3. The failure information monitoring apparatus according to claim 1, further comprising:

a failure level table that stores a failure level indicating an importance level of failure for each of a plurality of target components of the information processing apparatus, wherein the area control unit refers to a failure level corresponding to a target component of the extracted failure information in the failure level table when the extracted failure information is not able to be stored in the identified plurality of lower storage areas, and determines the storage location for the extracted failure information in the upper storage areas other than an upper storage area including the identified plurality of lower storage areas based on the area management table when the failure level is equal to or higher than a predetermined failure level.

4. The failure information monitoring apparatus according to claim 3, wherein the failure level table further stores, for each of the plurality of target components of the information processing apparatus, information of changing possibility in assignment of the storage location, and wherein the area control unit refers to the information of the changing possibility in the assignment of the identified plurality of lower storage areas before the change in the assignment of the storage location when the extracted failure information is not able to be stored in the identified plurality of lower storage areas.

5. A failure information monitoring method in a failure information monitoring apparatus which comprises a memory including a plurality of upper storage areas each of which is associated with a predetermined type of failure information and includes a plurality of lower storage areas at a predetermined location with a predetermined size, and an area management table storing, for each lower storage area, a type of failure information, an address, a size, and usage information indicating a usage status of the lower storage area, the failure information monitoring method comprising:

extracting failure information from an information processing apparatus;

determining a type of the extracted failure information;

identifying a plurality of the lower storage areas for the extracted failure information based on the determined type of the extracted failure information and the area management table; and storing the extracted failure information in the identified plurality of lower storage areas determined in the memory, wherein usage information of the area management table is referenced based on the determined type of the extracted failure information to determine whether the extracted failure information is able to be stored in the identified plurality of lower storage areas, a storage location for the extracted failure information is determined in the identified plurality of lower storage areas when the extracted failure information is able to be stored in the identified plurality of lower storage areas, and a storage location for the extracted failure information is determined in the plurality of upper storage areas other than an upper storage area including the identified plurality of lower storage areas based on the area management table when the extracted failure information is not able to be stored in the identified plurality of lower storage areas, and wherein the extracted failure information is stored in the determined storage location.

* * * * *